US009998052B2

(12) United States Patent
Shimada et al.

(10) Patent No.: US 9,998,052 B2
(45) Date of Patent: Jun. 12, 2018

(54) ROTARY ELECTRIC MACHINE CONTROL DEVICE

(71) Applicant: AISIN AW CO., LTD., Anjo-shi, Aichi-ken (JP)

(72) Inventors: Arinori Shimada, Nishio (JP); Masashi Miyazaki, Anjo (JP); Subrata Saha, Anjo (JP); Keisuke Nishimura, Kariya (JP); Ken Iwatsuki, Anjo (JP)

(73) Assignee: AISIN AW CO., LTD., Anjo (JP)

(*) Notice: Subject to any disclaimer, the term of this patent is extended or adjusted under 35 U.S.C. 154(b) by 0 days. days.

(21) Appl. No.: 15/127,980

(22) PCT Filed: Mar. 30, 2015

(86) PCT No.: PCT/JP2015/059919
§ 371 (c)(1),
(2) Date: Sep. 21, 2016

(87) PCT Pub. No.: WO2015/159694
PCT Pub. Date: Oct. 22, 2015

(65) Prior Publication Data
US 2017/0110999 A1    Apr. 20, 2017

(30) Foreign Application Priority Data
Apr. 17, 2014  (JP) ................................ 2014-085518

(51) Int. Cl.
*H02P 23/03*  (2006.01)
*H02P 6/18*  (2016.01)
*H02P 27/08*  (2006.01)

(52) U.S. Cl.
CPC ................ *H02P 23/03* (2013.01); *H02P 6/18* (2013.01); *H02P 27/08* (2013.01)

(58) Field of Classification Search
CPC ............. H02P 23/03; H02P 6/18; H02P 27/08
(Continued)

(56) References Cited

U.S. PATENT DOCUMENTS 5,565,760 A  * 10/1996 Ball ..................... B60L 11/1805
                                                   318/373
2010/0156330 A1* 6/2010 Inoue ........................ B60L 11/14
                                                   318/400.02
2012/0217849 A1* 8/2012 Aoki ............................ H02P 6/18
                                                   310/68 D

FOREIGN PATENT DOCUMENTS

JP      2005-110343 A      4/2005
JP         3796556 B2      7/2006
JP      2012-178950 A      9/2012

OTHER PUBLICATIONS

Jun. 2, 2015 International Search Report issued in Patent Application No. PCT/JP2015/059919.

* cited by examiner

*Primary Examiner* — Bentsu Ro
*Assistant Examiner* — Devon Joseph
(74) *Attorney, Agent, or Firm* — Oliff PLC

(57) ABSTRACT

The magnetic pole position of a rotary electric machine is electrically derived accurately by reducing a voltage error due to a dead time while suppressing the influence on the operation efficiency of the rotary electric machine. A control device performs dead-time compensation, and performs current feedback control in a d-q-axis vector coordinate system using a magnetic pole position computed on the basis of an induced voltage produced by rotation of a rotor or on the basis of a response component to a high-frequency observation signal applied to the rotary electric machine. In the case where the rotary electric machine is controlled by deciding current commands Id*, Iq* in the d-q-axis vector coordinate system, the rotary electric machine control device controls the rotary electric machine such that the magnitude of an armature current Ia becomes equal to or (Continued)

more than a lower-limit current Ia_min prescribed in advance.

12 Claims, 7 Drawing Sheets

(58) Field of Classification Search
USPC .......................................................... 318/400
See application file for complete search history.

ROTARY ELECTRIC MACHINE CONTROL DEVICE

I. TECHNICAL FIELD

Embodiments of the present disclosure relate to a rotary electric machine control device that controls a rotary electric machine that includes a rotor in which a permanent magnet is disposed and that is driven via an inverter that performs power conversion between AC power and DC power.

BACKGROUND ART

A control method called vector control is known as a control method for a rotary electric machine, e.g. an interior permanent magnet synchronous motor (IPMSM). In the vector control, feedback control is performed by subjecting motor currents that flow through stator coils of the motor to a coordinate conversion into vector components for a d-axis, which extends in the direction of a magnetic field generated by a permanent magnet disposed in a rotor, and a q-axis, which is orthogonal to the d-axis. For the coordinate conversion, it is necessary to accurately detect the position of the rotor (magnetic pole position). A rotation sensor such as a resolver is often used to detect the magnetic pole position. For IPMSMs which have magnetic saliency, however, there are proposed a variety of sensorless magnetic pole position detection techniques in which such a rotation sensor is not used. For example, there is known a method in which a magnetic pole position is detected utilizing an induced electromotive force produced by rotation of the rotor. In the case where the motor is rotating at a significantly low speed, e.g. when the motor is stationary, no induced electromotive force is produced at all, or only a slight induced electromotive force is produced. Therefore, there is also proposed a method of estimating a magnetic pole position in accordance with a response obtained when an observation signal with a high-frequency current or a high-frequency voltage is applied to the motor.

Drive of a rotary electric machine is often controlled via an inverter that performs power conversion between DC power and AC power. During switching control for the inverter, a so-called dead time, in which both upper switching elements and lower switching elements are turned off at the same time, is provided in order to prevent short-circuiting between the positive and negative electrodes of the inverter with both the upper switching elements and the lower switching elements turned on. Because of the dead time, the actual effective pulse width may be reduced with respect to the effective pulse width of a switching pulse based on a modulation command, and an error from a command value may be caused in output voltage obtained after conversion from DC power to AC power. The error may affect electrical detection of the magnetic pole position to cause a detection error. Therefore, dead-time compensation, in which an error in output voltage due to the dead time is reduced by shifting the start point and the end point of the effective pulse by the same time, is occasionally performed.

At the timing when the phase currents of AC power are close to the center of amplitude (close to zero), the dead-time compensation functions effectively. When the proportion of the period in which the phase currents have a value close to the center of amplitude (zero) to the cycle of the phase currents is large, such as in the case where the amplitude of the phase currents is small, however, the magnetic pole position cannot be detected accurately for a long period, as a result of which the accuracy in detecting the magnetic pole position may be lowered. Thus, Japanese Patent Application Publication No. 2012-178950 (Patent Document 1) proposes a technique for improving the detection accuracy by operating the phase of a current for controlling the control amount of a motor (seventh to ninth paragraphs, fifty-third to fifty-seventh paragraphs, etc.). With this method, however, torque ripple tends to be increased, because the current is set to an advanced phase and a delayed phase. In addition, the computation load for adjusting the phase of the current is increased. The influence of the dead time depends on torque of the motor and the voltage on the DC side of the inverter (DC link voltage). Even in the case where the influence of the dead time is relatively small, the efficiency may be lowered by adjusting the current phase or the like.

RELATED-ART DOCUMENTS

Patent Documents

[Patent Document 1] Japanese Patent Application Publication No. 2012-178950 (JP 2012-178950 A)

II. SUMMARY

In view of the foregoing background, it is desirable to provide a sensorless magnetic pole position detection technique that allows the magnetic pole position of a rotary electric machine to be electrically derived accurately by reducing a voltage error due to a dead time while suppressing the influence on the operation efficiency of the rotary electric machine.

Means for Solving the Problem

In view of the foregoing, one preferred embodiment provides a rotary electric machine control device that:

controls a rotary electric machine that includes a rotor in which a permanent magnet is disposed and that is driven via an inverter that performs power conversion between AC power and DC power;

detects a magnetic pole position of the rotor through sensorless control;

performs current feedback control, using the magnetic pole position, on the basis of a deviation between a current command and a feedback current from the rotary electric machine in a d-q-axis vector coordinate system defined by a d-axis which extends in a direction of a magnetic field generated by the permanent magnet and a q-axis which is orthogonal to the d-axis;

performs dead-time compensation in which a start point and an end point of a control pulse for switching elements that compose the inverter are adjusted to reduce an error in AC output due to a dead-time period, in which both an upper switching element and a lower switching element, of the switching elements, that compose an arm for one phase of the inverter are controlled into an off state, compared to that for a case where the control pulse is a reference pulse; and performs switching control on the switching elements to drive the rotary electric machine, in which in the case where the rotary electric machine is controlled by deciding the current command in the d-q-axis vector coordinate system such that a magnitude of an armature current is minimized in accordance with output torque of the rotary electric machine, the rotary electric machine is controlled such that the magnitude of the armature current becomes equal to or more than a lower-limit current prescribed in advance.

In order to accurately detect the magnetic pole position through sensorless control, it is useful to execute the dead-time compensation. To perform the dead-time compensation, however, it is generally necessary to determine the polarity of the phase current of AC power. Here, in the case where the amplitude of the phase current is small and the wave height of the phase current is close to the center of amplitude of the phase current, such as in the case where the rotary electric machine is driven by low torque, a high accuracy may be required for the determination of the polarity of the phase current, or the reliability of the determination may be lowered depending on the determination accuracy. In the present configuration, the current command is decided such that the armature current becomes equal to or more than the lower-limit current. The magnitude of the amplitude of the phase current can be secured by restraining a reduction in armature current. That is, the amplitude of the phase current can be secured such that the polarity of the phase current can be determined sufficiently. In the case where the magnitude of the armature current is equal to or more than the lower-limit current, the armature current is not restrained. Thus, the operation efficiency of the rotary electric machine is affected only in the case where the magnitude of the armature current is less than the lower-limit current. Thus, with the present configuration, it is possible to provide a sensorless magnetic pole position detection technique that allows the magnetic pole position of a rotary electric machine to be electrically derived accurately by reducing a voltage error due to a dead time while suppressing the influence on the operation efficiency of the rotary electric machine.

DETAILED DESCRIPTION

Figure 1:
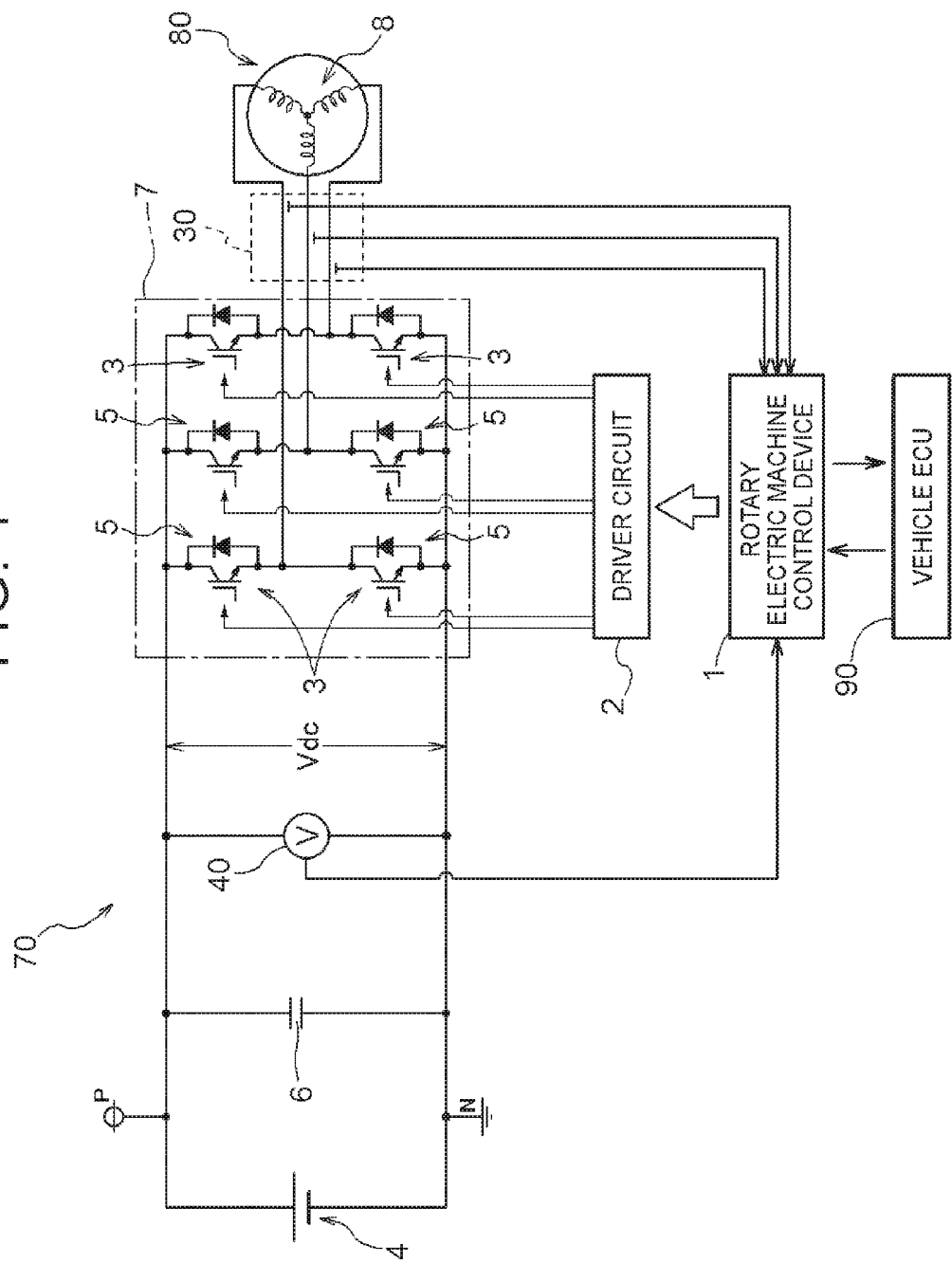
FIG. 1 is a block diagram schematically illustrating an example of the system configuration of a rotary electric machine control device.
Figure 2:
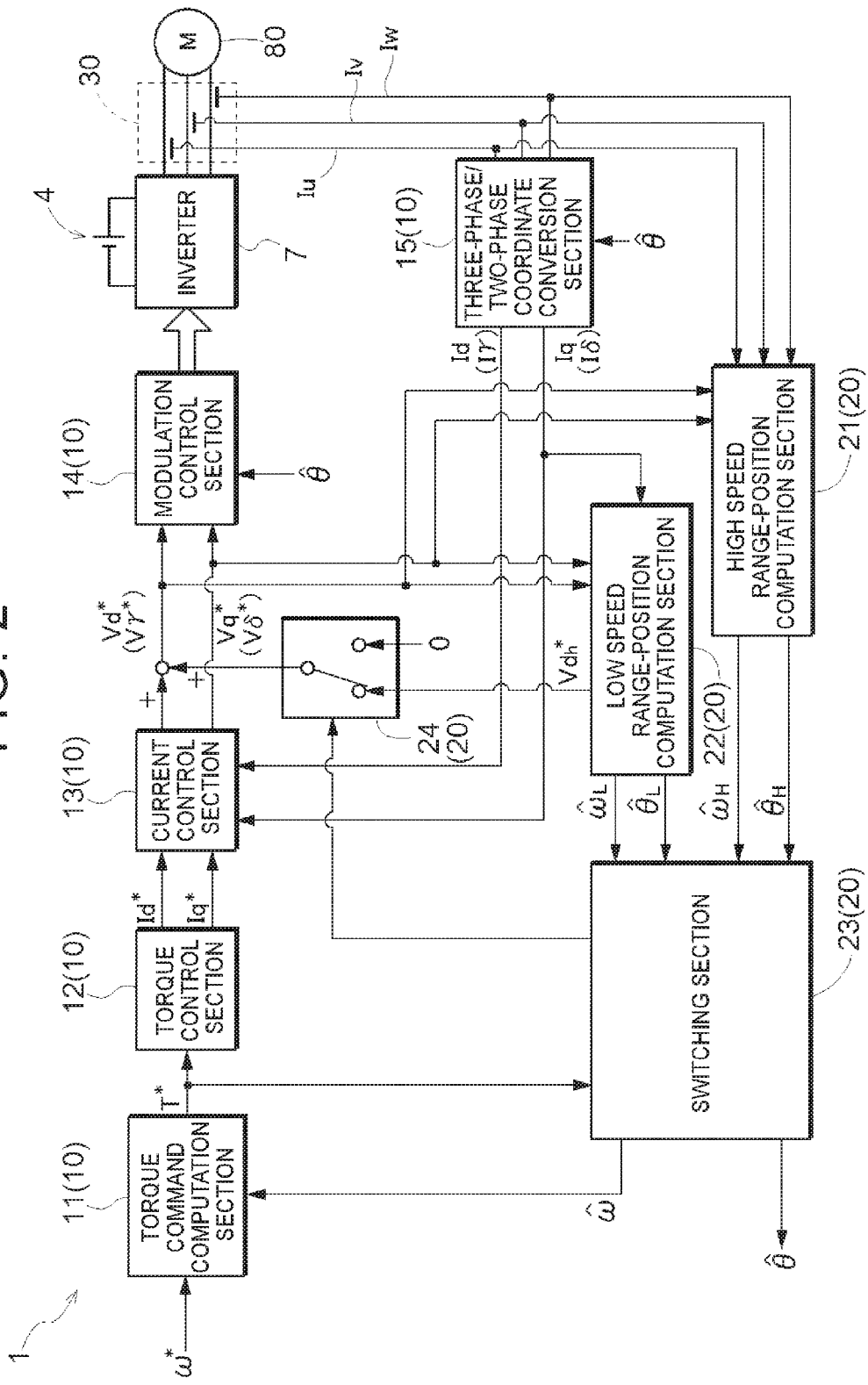
FIG. 2 is a block diagram schematically illustrating an example of the functional configuration of the rotary electric machine control device.

An embodiment will be described below with reference to the drawings. As illustrated in FIGS. 1 and 2, a rotary electric machine control device 1 is a control device provided with a function of detecting the rotational state (the magnetic pole position and the rotational speed) of an AC rotary electric machine 80 in a so-called sensorless manner without using a rotation sensor such as a resolver. In the embodiment, the rotary electric machine 80 is an interior permanent magnet synchronous motor (IPMSM), and has saliency (including inverse saliency), that is, the magnetic properties in the direction of the N pole of a permanent magnet of a rotor are different from the magnetic properties in a direction that is electrically perpendicular thereto (direction that is shifted by an electrical angle of 90° therefrom). In the embodiment, as discussed in detail later, a motor control device utilizes the saliency to determine the rotational state such as the magnetic pole position, the magnetic pole direction, and the rotational speed through sensorless control even when the rotary electric machine 80 is stationary or rotating at a low speed. Thus, the present preferred embodiment can also be applied to other types of rotary electric machine having saliency, e.g. synchronous reluctance motors. As a matter of course, the rotary electric machine 80 includes a motor (electric motor), a generator (electric generator), and a motor generator that functions both as a motor and as a generator as necessary.

As discussed above, the rotary electric machine 80 to be controlled by the rotary electric machine control device 1 includes a rotor in which a permanent magnet is disposed, and is driven via an inverter that performs power conversion between AC power and DC power. In other words, as illustrated in FIG. 1, the rotary electric machine control device 1 controls a rotary electric machine drive device 70 that includes an inverter 7 and a DC link capacitor 6, and controls drive of the rotary electric machine 80 via the rotary electric machine drive device 70. The inverter 7 is a power conversion device connected to the AC rotary electric machine 80 to perform power conversion between DC power and multi-phase AC power (here, three-phase AC power). An arm corresponding to one phase of AC power is constituted of a series circuit with an upper switching element and a lower switching element. The DC link capacitor 6 smoothes a DC link voltage Vdc, which is the voltage on the DC side of the inverter 7.

In the embodiment, the rotary electric machine 80 is used as a drive force source for a vehicle such as a hybrid vehicle and an electric vehicle, for example. Vehicles such as automobiles that cannot receive power supplied from an overhead wire like railway vehicles are provided with a DC power source 4 such as a secondary battery (battery), such as a nickel-hydrogen battery or a lithium-ion battery, an electric double layer capacitor, or the like as a power source for driving the rotary electric machine 80. In the embodiment, the DC power source 4 with a power source voltage of 200 to 400 [V], for example, is provided as a high-voltage high-capacity DC power source for supplying power to the rotary electric machine 80. Because the rotary electric machine 80 is an AC rotary electric machine, the inverter 7 which performs power conversion between DC power and AC power (here, three-phase AC) is provided between the DC power source 4 and the rotary electric machine 80. Hereinafter, the voltage between a positive power source line P and a negative power source line N on the DC side of the inverter 7 will be referred to as "DC link voltage Vdc". The DC power source 4 can supply power to the rotary electric machine 80 via the inverter 7, and can store power obtained through power generation performed by the rotary electric machine 80. A smoothing capacitor (DC link capacitor 6) that smoothes the voltage (DC link voltage Vdc)

between the positive and negative electrodes on the DC side of the inverter 7 is provided between the inverter 7 and the DC power source 4. The DC link capacitor 6 stabilizes a DC voltage (DC link voltage Vdc) that fluctuates in accordance with fluctuations in power consumption of the rotary electric machine 80.

The inverter 7 converts DC power having the DC link voltage Vdc into AC power with a plurality of phases (n phases with n being a natural number; here, three phases) to supply the AC power to the rotary electric machine 80, and converts AC power generated by the rotary electric machine 80 into DC power to supply the DC power to the DC power source. The inverter 7 is configured to have a plurality of switching elements. The switching elements are preferably power semiconductor elements that can operate at a high frequency, such as IGBTs (Insulated Gate Bipolar Transistors), power MOSFETs (Metal Oxide Semiconductor Field Effect Transistors), SiC-MOSFETs (Silicon Carbide-Metal Oxide Semiconductor FETs), SiC-SITs (SiC-Static Induction Transistors), and GaN-MOSFETs (Gallium Nitride-MOSFETs). In the embodiment, as illustrated in FIG. 1, IGBTs 3 are used as the switching elements.

The inverter 7 which converts power between DC power and multi-phase AC power (here, three-phase AC power), for example, is constituted of a bridge circuit that has the number of arms, the number corresponding to the number of the phases (here, three phases), as is well known. That is, as illustrated in FIG. 1, two IGBTs 3 are connected in series between the DC positive electrode side (the positive power source line P on the positive electrode side of the DC power source) and the DC negative electrode side (the negative power source line N on the negative electrode side of the DC power source) of the inverter 7 to compose one arm. In the case of three-phase AC power, the series circuit (one arm) is connected in parallel for three lines (three phases). That is, a bridge circuit in which a set of series circuits (arm) corresponds to each of stator coils 8 of the rotary electric machine 80 corresponding to one of U-phase, V-phase, and W-phase is constituted.

The middle point between the series circuits (arms) formed by a pair of IGBTs 3 for each phase, that is, the point of connection between the IGBT 3 on the positive power source line P side (upper IGBT (upper switching element)) and the IGBT 3 on the negative power source line N side (lower IGBT (lower switching element)), is connected to each of the stator coils 8 of the rotary electric machine 80. A freewheeling diode (FWD) 5 is provided in parallel with each of the IGBTs 3 with the direction from the negative electrode (negative power source line N) to the positive electrode (positive power source line P) (the direction from the lower side toward the upper side) defined as the forward direction.

As illustrated in FIG. 1, the inverter 7 is controlled by the rotary electric machine control device 1. The rotary electric machine control device 1 is configured as an ECU (electronic control unit) constructed of a logic circuit such as a microcomputer as its core member. As illustrated in FIG. 2, the rotary electric machine control device 1 is configured to include an inverter control section 10 and a rotational state information computation section 20. The inverter control section 10 and the rotational state information computation section 20 are each configured to have a variety of functional sections, which are each implemented through cooperation between hardware such as a microcomputer and software (a program). For example, the rotary electric machine control device 1 decides a torque command T* on the basis of target torque and a target speed for the rotary electric machine 80 provided as a request signal from another control device or the like such as a vehicle ECU 90 via a CAN (Controller Area Network) or the like, and controls the rotary electric machine 80 via the inverter 7.

The rotary electric machine control device 1 (inverter control section 10) performs pulse width modulation (PWM) control, for example, as the mode of switching patters (mode of voltage waveform control) for the IGBTs 3 which compose the inverter 7. In addition, the rotary electric machine control device 1 has, as the modes of field control for a stator, normal field control (basic control) such as maximum torque control in which maximum torque is output for an armature current and maximum efficiency control in which the motor is driven at a maximum efficiency for an armature current, and field regulation control such as field weakening control in which a field current that does not contribute to torque is applied to weaken field magnetic flux and field intensifying control in which field magnetic flux is intensified conversely. In the embodiment, the rotary electric machine control device 1 controls the rotary electric machine 80 by executing current feedback control using a current vector control method in a two-axis orthogonal vector space (coordinate system) that rotates in synchronization with rotation of the rotary electric machine 80. In the current vector control method, for example, the current feedback control is performed in the two-axis orthogonal vector space which is defined by a d-axis which extends along the direction of field magnetic flux generated by a permanent magnet and a q-axis which is electrically advanced by $\pi/2$ with respect to the d-axis.

The gate terminal, which is a control terminal, of each of the IGBTs 3 which compose the inverter 7 is connected to the rotary electric machine control device 1 via a driver circuit 2 to be individually subjected to switching control. A high voltage-system circuit for driving the rotary electric machine 80 and a low voltage-system circuit such as the rotary electric machine control device 1 which has a microcomputer or the like as its core have significantly different operating voltages (power source voltages for the circuits). Therefore, the driver circuit 2 (control signal drive circuit) which relays a gate drive signal (switching control signal) for each of the IGBTs 3 with the drive capability of the gate drive signal (capability to cause the following circuit to operate, such as the voltage amplitude and the output current, for example) improved is provided. A gate drive signal for the IGBTs 3 generated by the rotary electric machine control device 1 which is a low voltage-system circuit is supplied to the inverter 7 as a gate drive signal for a high voltage-system circuit via the driver circuit 2. The driver circuit 2 is constituted utilizing an insulating element such as a photocoupler and a transformer and a driver IC, for example.

Thus, the rotary electric machine 80 is driven at predetermined output torque and rotational speed via the inverter 7 which is subjected to switching control performed by the inverter control section 10. In this event, the value of a current that flows through each stator coil of the rotary electric machine 80 is fed back to the inverter control section 10. The inverter control section 10 executes PI control (proportional-integral control) or PID control (proportional-integral-differential control) on the deviation from current commands (Id*, Iq*) decided in accordance with the torque command T* to control drive of the rotary electric machine 80. In order to achieve such feedback control, a current (Iu, Iv, Iw) that flows through a conductor such as a bus bar provided between an arm of the inverter 7 for each phase and a stator coil of the rotary electric machine 80 for each phase is detected by a current sensor 30.

Now, vector control performed by the inverter control section 10 will be described briefly. In such vector control, the vector space (coordinate system) is a d-q-axis vector coordinate system (d-q-axis vector space) defined by a d-axis, which extends in the direction of a magnetic field generated by a permanent magnet disposed in the rotor of the rotary electric machine 80, and a q-axis, which is electrically orthogonal to the d-axis. In the embodiment, the inverter control section 10 is configured to include a torque command computation section 11, a torque control section 12 (current command computation section), a current control section 13 (voltage command computation section), a modulation control section 14, and a three-phase/two-phase coordinate conversion section 15.

In the embodiment, the torque command computation section 11 computes a torque command T* (target torque) on the basis of a speed command ω* (target speed) from an upstream ECU or the like such as the vehicle ECU 90 and the actual rotational speed. In the embodiment, rotation of the rotary electric machine 80 is detected in a sensorless manner without using a rotation sensor such as a resolver. Thus, the actual rotational speed is an estimated rotational speed estimated by the rotational state information computation section 20, and indicated by ω with ^ (hat) as illustrated in FIG. 2 (indicated as ω^ in the specification for convenience). The torque control section 12 references a map, for example, in accordance with the torque command T* to set (decide) current commands Id*, Iq* for vector control. The current commands Id*, Iq* are set in correspondence with the d-q-axis vector coordinate system discussed above.

The current control section 13 performs PI control, for example, on the deviation between the current commands Id*, Iq* in the d-q-axis vector coordinate system and feedback currents Id, Iq to compute voltage commands Vd*, Vq* in the d-q-axis vector coordinate system. The feedback currents Id, Iq are the detected values of three-phase currents (Iu, Iv, Iw) that flow through the stator coils of the rotary electric machine 80, the detected values having been subjected to a coordinate conversion performed by the three-phase/two-phase coordinate conversion section 15 into a d-q-axis vector coordinate system with two phases and fed back. The voltage commands Vd*, Vq* are subjected to a coordinate conversion performed by the modulation control section 14 into voltage commands for three phases. The modulation control section 14 generates a switching control signal for switching control of the inverter 7 on the basis of the voltage commands for three phases through pulse width modulation (PWM), for example.

The coordinate conversions performed by the modulation control section 14 and the three-phase/two-phase coordinate conversion section 15 are performed on the basis of a magnetic pole position θ of the rotor. That is, in order to perform vector control on the rotary electric machine 80, it is necessary to perform a coordinate conversion between the real three-phase space and the two-phase d-q-axis vector coordinate system. Therefore, it is necessary to accurately detect the magnetic pole position θ of the rotor. The embodiment adopts sensorless control in which the magnetic pole position θ of the rotor is estimated with no rotation detection device such as a resolver provided. Thus, the magnetic pole position θ is an estimated magnetic pole position, and is indicated by θ with ^ as illustrated in FIG. 1 (indicated as θ^ in the specification for convenience).

While the rotary electric machine 80 is rotating, magnetic pole position information is included in an induced electromotive force. Therefore, an induced electromotive force is estimated from an inverter output voltage and the feedback currents (Id, Iq) to estimate the rotational speed ω (estimated rotational speed ω^) and the magnetic pole position θ (estimated magnetic pole position θ^). When the rotary electric machine 80 is stationary, on the other hand, no induced electromotive force is produced as a matter of course. When the rotary electric machine 80 is rotating at a low speed, meanwhile, the induced electromotive force is accordingly small. Therefore, it is necessary to use another method to compute the rotational speed ω (ω^) and the magnetic pole position θ (θ^). For example, in the case where the rotary electric machine 80 is stationary or rotating at a low speed, a high-frequency observation signal (observation current or observation voltage) that serves as an electrical stimulus is applied to the rotary electric machine 80, and the rotational speed ω (ω^) and the magnetic pole position θ (θ^) are computed from a response to the observation signal.

In the embodiment, as illustrated in FIG. 2, two position computation sections, namely a high speed range-position computation section 21 and a low speed range-position computation section 22, are provided. The high speed range-position computation section 21 mainly computes a rotational speed ω ($ω^{\wedge}_H$) and a magnetic pole position θ ($θ^{\wedge}_H$) in a high speed rotation range in which an induced electromotive force (induced voltage) can be utilized. The low speed range-position computation section 22 mainly computes a rotational speed ω ($ω^{\wedge}_L$) and a magnetic pole position θ ($θ^{\wedge}_L$) in a low speed rotation range using a high-frequency observation signal. The result ($ω^{\wedge}_H$ and $θ^{\wedge}_H$) of computation by the high speed range-position computation section 21 and the result ($ω^{\wedge}_L$ and $θ^{\wedge}_L$) of computation by the low speed range-position computation section 22 are selected or synthesized by the switching section 23 as discussed later to be utilized by the torque command computation section 11, the modulation control section 14, and the three-phase/two-phase coordinate conversion section 15. For example, the switching section 23 may decide the rotational speed ω (ω^) and the magnetic pole position θ (θ^) by selecting one of: a low-speed computation mode performed by the low speed range-position computation section 22; a high-speed computation mode performed by the high speed range-position computation section 21; and a synthesis mode in which a weighted average, which matches the rotational speed, of the result ($ω^{\wedge}_L$ and $θ^{\wedge}_L$) of computation by the low speed range-position computation section 22 and the result ($ω^{\wedge}_H$ and $θ^{\wedge}_H$) of computation by the high speed range-position computation section 21 is adopted. In addition, the switching section 23 also controls a switch 24 so as to switch whether or not to apply a high-frequency observation signal (here, "$Vd_h^*$").

The method of computing the rotational state information (θ^, ω^) by the high speed range-position computation section 21 and the low speed range-position computation section 22 will be briefly described below. The high speed range-position computation section 21 computes the magnetic pole position θ (θ^) of the rotor using an "extended induced voltage model" that uses an extended induced voltage obtained by summing an induced voltage generated by rotation of magnetic flux generated in the rotor by a d-axis current, an induced voltage generated by variations in current that flows through the q-axis inductance on the stator side, and an induced voltage generated by rotation of magnetic flux of the permanent magnet. The "extended induced voltage model" is described in detail in a technical paper by Shinji Ichikawa et al. "Sensorless Controls of Salient-Pole Permanent Magnet Synchronous Motors Using Extended Electromotive Force Models" (T. IEE Japan, vol. No. 12, 2002), and thus is not described in detail herein.

A common circuit equation (voltage equation) in the rotating coordinate system (d-q-axis vector coordinate system) of a rotary electric machine that has magnetic saliency is represented by the following expression (1). In the expression, p indicates a differential operator, Ld and Lq indicate the d-axis inductance and the q-axis inductance, respectively, and $K_E$ indicates an induced voltage constant. The voltage equation by the "extended induced voltage model" is indicated by the expression (2). The second term of the expression (2) is defined as "extended induced voltage" (following expression (3)). In the expressions (2) and (3), the symbol "•" added to "Iq" signifies a time differential of "Iq", and is used differently from the differential operator p in the expression (1) because differentiation is only applied to a dotted variable.

[Expression 1]

$$\begin{bmatrix} Vd \\ Vq \end{bmatrix} = \begin{bmatrix} R+pLd & -\omega Lq \\ \omega Ld & R+pLq \end{bmatrix} \begin{bmatrix} Id \\ Iq \end{bmatrix} + \begin{bmatrix} 0 \\ \omega K_E \end{bmatrix} \quad (1)$$

[Expression 2]

$$\begin{bmatrix} Vd \\ Vq \end{bmatrix} = \begin{bmatrix} R+pLd & -\omega Lq \\ \omega Lq & R+pLd \end{bmatrix} \begin{bmatrix} Id \\ Iq \end{bmatrix} + \begin{bmatrix} 0 \\ (Ld-Lq)(\omega id - iq) + \omega K_E \end{bmatrix} \quad (2)$$

[Expression 3]

$$\begin{bmatrix} Ed \\ Eq \end{bmatrix} = \{(Ld-Lq)(\omega id - iq) + \omega K_E\} \begin{bmatrix} 0 \\ 1 \end{bmatrix} \quad (3)$$

The term "(Ld−Lq)ωId" on the right side of the expression (3) indicates the induced voltage generated by rotation of magnetic flux generated in the rotor by a d-axis current. The term "(Ld−Lq)Iq" (with a dot that signifies a time differential omitted) on the right side of the expression (3) indicates the induced voltage generated by variations in current that flows through the q-axis inductance on the stator side. The term "ωK$_E$" on the right side of the expression (3) indicates the induced voltage generated by rotation of magnetic flux of the permanent magnet attached to the rotor. That is, position information in the permanent magnet of the rotary electric machine and the inductance is all aggregated in the "extended induced voltage". Although a detailed description is found in the paper by Ichikawa et al. and thus not presented herein, when the expression (2) is converted into a fixed coordinate system (e.g. α-β-axis vector coordinate system) set to the stator of the rotary electric machine, there is no term that includes a value (according to the technical paper, "2θ") that is difficult to process in estimating the magnetic pole position, which makes computation for estimation easy. In computing the magnetic pole position using a common induced voltage model, it is necessary to use approximation, which may reduce the estimation accuracy. In the case where an extended induced voltage model is used, however, approximation is not required, which makes it possible to accurately estimate the magnetic pole position θ (θ^) and the rotational speed ω (ω^).

Figure 3:
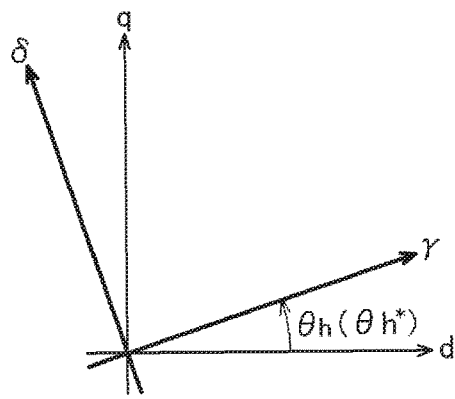
FIG. 3 illustrates the relationship between a d-q-axis vector coordinate system and a δ-γ-axis vector coordinate system.

The low speed range-position computation section 22 applies a high-frequency observation signal to the rotary electric machine 80, and computes the magnetic pole position θ (θ^) of the rotor on the basis of a high-frequency component fed back as included in a feedback current as a response component to the observation signal. In the embodiment, a high-frequency observation signal (Vd$_h$*: V$_{ah}$ cos(ω^$_h$t)) to be superimposed on a d-axis voltage command Vd is generated. As illustrated in FIG. 3, a phase difference of "θ$_h$" (as a command value, a phase command "θ$_h$*") is present between a coordinate system (γ-δ-axis vector coordinate system) that matches the observation signal and the d-q-axis vector coordinate system. A response component to the phase difference superimposed on a voltage command as a command value is included in the feedback current from the rotary electric machine 80. For example, a response component to the high-frequency observation signal is extracted from the q-axis feedback current Iq (δ-axis feedback current Iδ) using a high-pass filter, and the response component is demodulated via a high-pass filter, a heterodyne circuit (mixer), a low-pass filter, and so forth.

Figure 4:
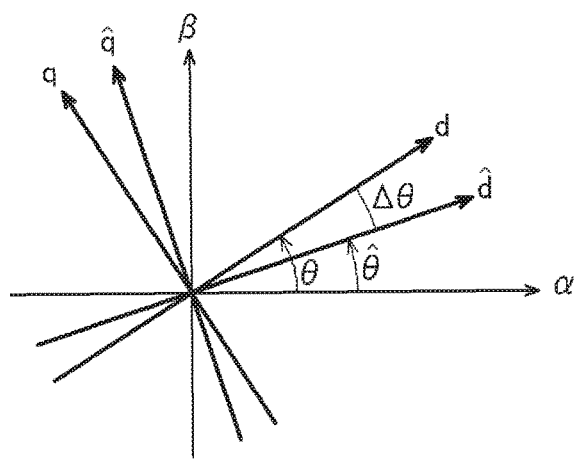
FIG. 4 illustrates the relationship between an α-β-axis vector coordinate system and the d-q-axis vector coordinate system.

When the relationship between the fixed coordinate system (α-β-axis vector coordinate system) set to the stator of the rotary electric machine 80 and the d-q-axis vector coordinate system is considered, the d-q-axis vector coordinate system rotates with respect to the α-β-axis vector coordinate system, and the magnetic pole position θ can be defined as a phase angle "θ" based on the α- and β-axes as illustrated in FIG. 4. In addition, the rotational speed ω of the rotor can be defined as the rotational speed ω of the d-q-axis vector coordinate system with respect to the α-β-axis vector coordinate system. In the case where the magnetic pole position θ is estimated through computation as in the embodiment, the actual d-q-axis vector coordinate system cannot be directly detected. Thus, as indicated by the d- and q-axes with ^ (hat) in FIG. 4, an estimated d-q-axis vector coordinate system based on the magnetic pole position θ^ estimated through computation is set. The magnetic pole position of the rotor based on the α- and β-axes is defined as "θ^" with ^ as illustrated in FIG. 4, and the rotational speed of the estimated d-q-axis vector coordinate system with respect to the α-β-axis vector coordinate system is defined as "ω^" with ^.

As illustrated in FIG. 4, the estimated d-q-axis vector coordinate system is caused to coincide with the actual d-q-axis vector coordinate system by converging Δθ, which corresponds to an error between the actual d-q-axis vector coordinate system and the estimated d-q-axis vector coordinate system, to zero. That is, the estimated d- and q-axes are caused to match the actual d- and q-axes by converging Δθ to zero, and thus the magnetic pole position is detected accurately. The rotational state information computation section 20 computes the magnetic pole position using the principle. For example, PI control is executed on the demodulated response component by a phase synchronization section (PLL: phase locked loop) such that "Δθ" becomes "0". An estimated rotational speed "ω^$_L$" is calculated as a result of the PI control. A distance, that is, an angle, is obtained by integrating a rotational speed (angular speed). Thus, an estimated magnetic pole position "θ^$_L$" is calculated by integrating the estimated rotational speed "ω^$_L$" using an integrator.

Figure 5:
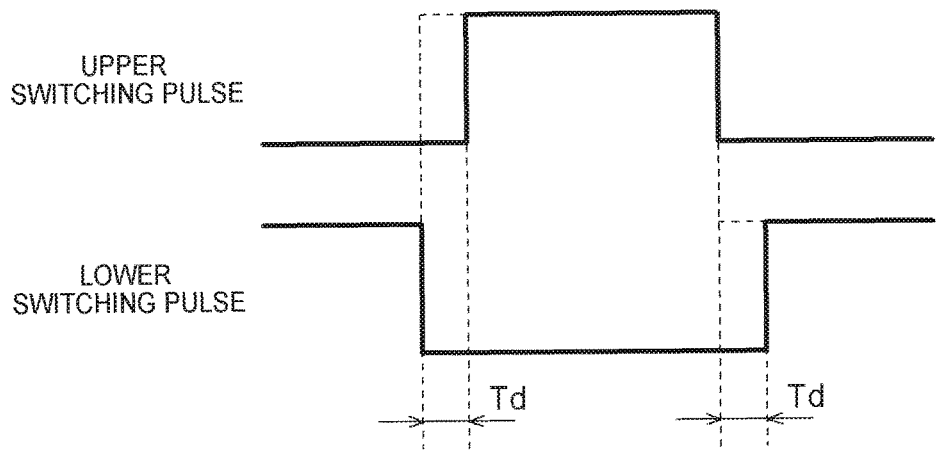
FIG. 5 illustrates a dead time.

During switching control for the inverter, a so-called dead time Td (see FIG. 5), which is a period in which both upper switching elements and lower switching elements are turned off at the same time, is provided in order to prevent short-circuiting between the positive electrode side and the negative electrode side with both the upper switching elements and the lower switching elements turned on. For example, the dead time Td is provided by delaying the rise (broken line) of an ideal switching pulse (control pulse) based on a modulation command by a predetermined period to generate a reference pulse. Because of the dead time Td, the effective pulse width of the actual pulse (basic pulse) may be reduced with respect to the effective pulse width of a switching pulse (ideal pulse) based on a modulation command, and an error ΔV may be caused in output voltage obtained after conversion from DC power to AC power (see FIG. 6). The error ΔV in voltage caused because of the dead time Td can be approximately considered as a square wave voltage as indicated by the dash-and-dot line in FIG. 6. The amplitude (error ΔV) of the square wave voltage is represented by "ΔV≈Ed·Td·fc", where the DC link voltage Vdc is indicated by "Ed" and the carrier frequency during modulation is indicated by "fc".

As discussed above, the high speed range-position computation section 21 computes the magnetic pole position ($\theta\hat{}_H$) on the basis of the voltage equation (expression (2)), and the error ΔV affects the result of the computation. Meanwhile, the low speed range-position computation section 22 computes the magnetic pole position ($\theta\hat{}_L$) on the basis of the response component to the observation signal on the assumption that a voltage that matches the voltage commands (Vd*, Vq*) is output. Thus, if the error ΔV is caused in the output voltage, the result of the computation of the magnetic pole position ($\theta\hat{}_L$) is affected.

Figure 7:
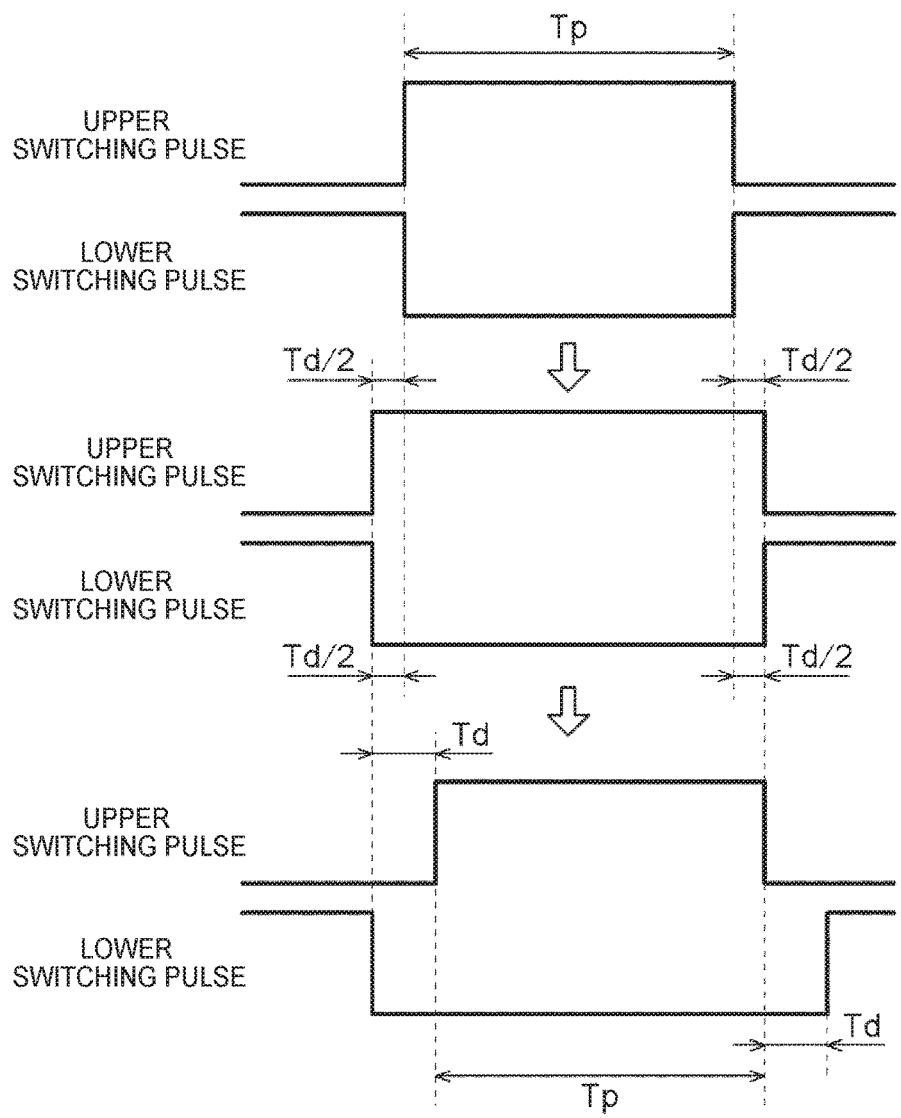
FIG. 7 illustrates an example of dead-time compensation.

Therefore, as exemplified in FIG. 7, dead-time compensation in which the error ΔV in output voltage due to the dead time Td is reduced by shifting the start point and the end point of the effective pulse by the same time is performed. For example, the dead-time compensation is executed in accordance with the polarity of the three-phase currents (Iu, Iv, Iw). FIG. 7 exemplifies the procedure for the dead-time compensation for a case where the phase current is positive. The upper part of FIG. 7 illustrates a theoretical switching pulse based on a modulation command. In the case where the phase current is positive, the pulse width "Tp" of the theoretical switching pulse is extended on both sides by "Td/2" each (see the middle part of FIG. 7). Specifically, the on period of the upper switching element is elongated on both sides by "Td/2" each, and the corresponding off period of the lower switching element is elongated on both sides by "Td/2" each (on periods adjacent to the off period, which precede and follow the off period, are shortened by "Td/2" each). Next, as discussed above with reference to FIG. 5, the rise of the switching pulse is delayed by a predetermined period corresponding to the dead time Td (see the lower part of FIG. 7). The on period of the upper switching pulse is elongated by "Td (Td/2)×2" and thereafter shortened by an amount corresponding to the dead time Td, and thus the theoretical switching pulse "Tp" is maintained with the amount of the elongation and the amount of the shortening canceling each other.

In the dead-time compensation for a case where the phase current is negative, the on period of the upper switching element is shortened on both sides by "Td/2" each, and the corresponding off period of the lower switching element is shortened on both sides by "Td/2" each (on periods adjacent to the off period, which precede and follow the off period, are extended by "Td/2" each). That is, the dead-time compensation for a case where the phase current is negative is performed in the opposite manner of the case where the phase current is positive and can be easily reasoned by analogy, and thus is not illustrated or described in detail.

To perform such dead-time compensation, it is necessary to determine the polarity of the phase currents (Iu, Iv, Iw). When the phase current is in the vicinity of zero (in the vicinity of the center of amplitude), however, the reliability of the determination as to the polarity may be lowered because of the resolution of the current sensor 30, the influence of current ripple, and so forth. Therefore, the dead-time compensation may not function sufficiently, and the accuracy in detecting the magnetic pole position may also be lowered. In the case where the amplitude of the phase current is small, that is, in the case where the magnitude of an armature current Ia is small, meanwhile, the current value is close to zero also at the wave height (peak and bottom) of the phase current, which lowers the reliability of the determination as to the polarity. Therefore, in the embodiment, adjustment is performed such that the amplitude of the phase current becomes equal to or more than a certain level in order that the dead-time compensation can be performed appropriately. Specifically, in deciding the current commands (Id*, Iq*) in the d-q-axis vector coordinate system in accordance with the output torque of the rotary electric machine 80, the rotary electric machine control device 1 decides the current commands (Id*, Iq*) such that the magnitude of the armature current Ia becomes equal to or more than a lower-limit current (Ia min) prescribed in advance.

Figure 8:
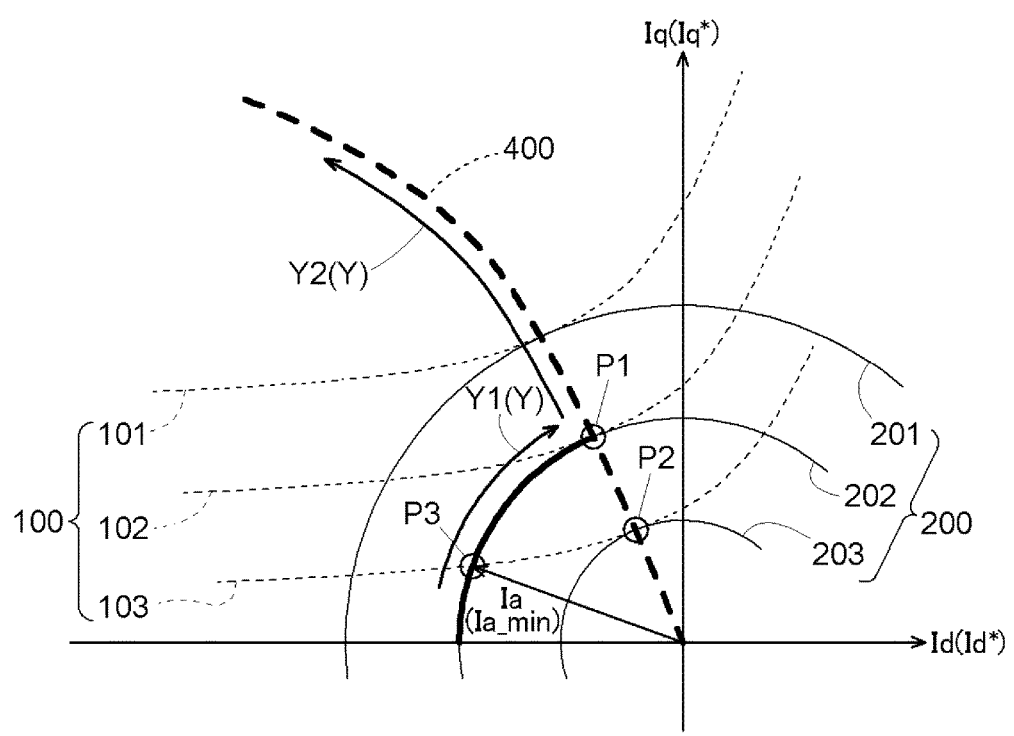
FIG. 8 schematically illustrates the relationship between an operation point and a current command in a current vector space.

FIG. 8 illustrates a current vector space (coordinate system). In FIG. 8, curves 100 (each of curves 101 to 103) represent "equal torque curves". The equal torque curves 100 (101 to 103) each indicate a vector locus of the armature current Ia on which the rotary electric machine 80 outputs certain torque. The equal torque curve 102 corresponds to torque lower than that for the equal torque curve 101, and the equal torque curve 103 corresponds to torque lower than that for the equal torque curve 102. The magnitude of the armature current Ia is the magnitude of a vector synthesized from a d-axis current (Id) and a q-axis current (Iq) ($Ia^2=Id^2+Iq^2$). A vector synthesized from a u-phase current Iu, a v-phase current Iv, and a w-phase current Iw in a three-phase coordinate system with u-, v-, and w-phases and the vector synthesized from the d-axis current (Id) and the q-axis current (Iq) are the same as each other, and are the armature current Ia. Curves 200 (each of curves 201 to 203) indicate "constant-current circles". The constant-current circle is a vector locus on which the magnitude of the armature current Ia has a constant value. The d-axis and q-axis current commands (Id*, Iq*) are set as current values at an operation point (e.g. P1, P2, and P3) in such a current vector space.

In FIG. 8, a curve 400 is a vector locus (maximum torque control curve) of an operation point during execution of maximum torque control (basic control). As discussed above, the rotary electric machine control device 1 executes, as the basic control, maximum torque control in which maximum torque is output for the armature current Ia, maximum efficiency control in which the motor is driven with a maximum efficiency for the armature current Ia, or the like. Here, the maximum torque control is executed as the basic control. During execution of the basic control, the torque control section 12 illustrated in FIG. 2 references a map such as that exemplified in FIG. 8 to set, as an operation point, an intersection between the equal torque curve 100 which is selected on the basis of the torque command T* and the maximum torque control curve 400, and decide the d-axis current and the q-axis current at the operation point as the current commands (Id*, Iq*). If the magnitude of the armature current Ia at the operation point is equal to or more than the lower-limit current Ia_min which is prescribed in advance, the current values at the operation point on the maximum torque control curve 400 are decided as the current commands.

For example, it is assumed that the magnitude of the armature current Ia at the operation point P1 illustrated in FIG. 8 is equal to or more than the lower-limit current Ia_min, and that the magnitude of the armature current Ia at the operation point P2 is less than the lower-limit current Ia_min. Since the magnitude of the armature current Ia at the operation point PI is equal to or more than the lower-limit current Ia_min, the d-axis and q-axis current values at the operation point P1 are decided as the current commands (Id*, Iq*). Since the magnitude of the armature current Ia is less than the lower-limit current Ia_min at the operation point P2, on the other hand, the operation point is moved on the equal torque curve 103 until the magnitude of the armature current Ia becomes equal to or more than the lower-limit current Ia_min. Specifically, the operation point is moved to an intersection between the constant-current circle 200 which indicates the lower-limit current Ia_min and the equal torque curve 103. In the embodiment, the magnitude of the armature current Ia at the operation point P1 is set to the lower-limit current Ia_min. Thus, an intersection between the constant-current circle 203 and the equal torque curve 103 is set as the operation point P3 after being moved. Then, the d-axis and q-axis current values at the operation point P3 are decided as the current commands (Id*, Iq*). The constant-current circle 203 is also a vector locus of a constant armature current (Ia') in constant-current control to be described below.

The basic control in which the operation point is set on the maximum torque control curve 400 is, put differently, control in which the current commands (Id*, Iq*) are decided such that the magnitude of the current Ia is minimized in accordance with the output torque of the rotary electric machine 80. That is, the basic control is control in which the contact point between the constant-current circle 200 and the equal torque curve 100 is used as the operation point. On the other hand, control in which the current commands are decided by moving the operation point from the operation point P2 to the operation point P3 on the equal torque curve 100 is control in which the operation point is set on the constant-current circle 200. Thus, in the embodiment, such control is referred to as constant-current control. As discussed above, the constant-current circle 200 is also a vector locus of a constant armature current (Ia') in the constant-current control. In the constant-current control, the operation point is set at an intersection between the constant-current circle 200 and the equal torque curve 100.

In the case where the magnitude of the armature current Ia in the basic control falls below the lower-limit current Ia_min, the rotary electric machine control device 1 executes the constant-current control in which the current commands (Id*, Iq*) are decided such that the magnitude of the armature current Ia matches the lower-limit current Ia_min. That is, the rotary electric machine control device 1 (torque control section 12) can execute the basic control and the constant-current control, and switchably executes the basic control and the constant-current control in accordance with the magnitude of the armature current Ia at the operation point based on the torque command T*. In the case where control that includes such constant-current control is performed, the operation point follows a locus such as that indicated by the arrow Y in FIG. 8.

Figure 9:
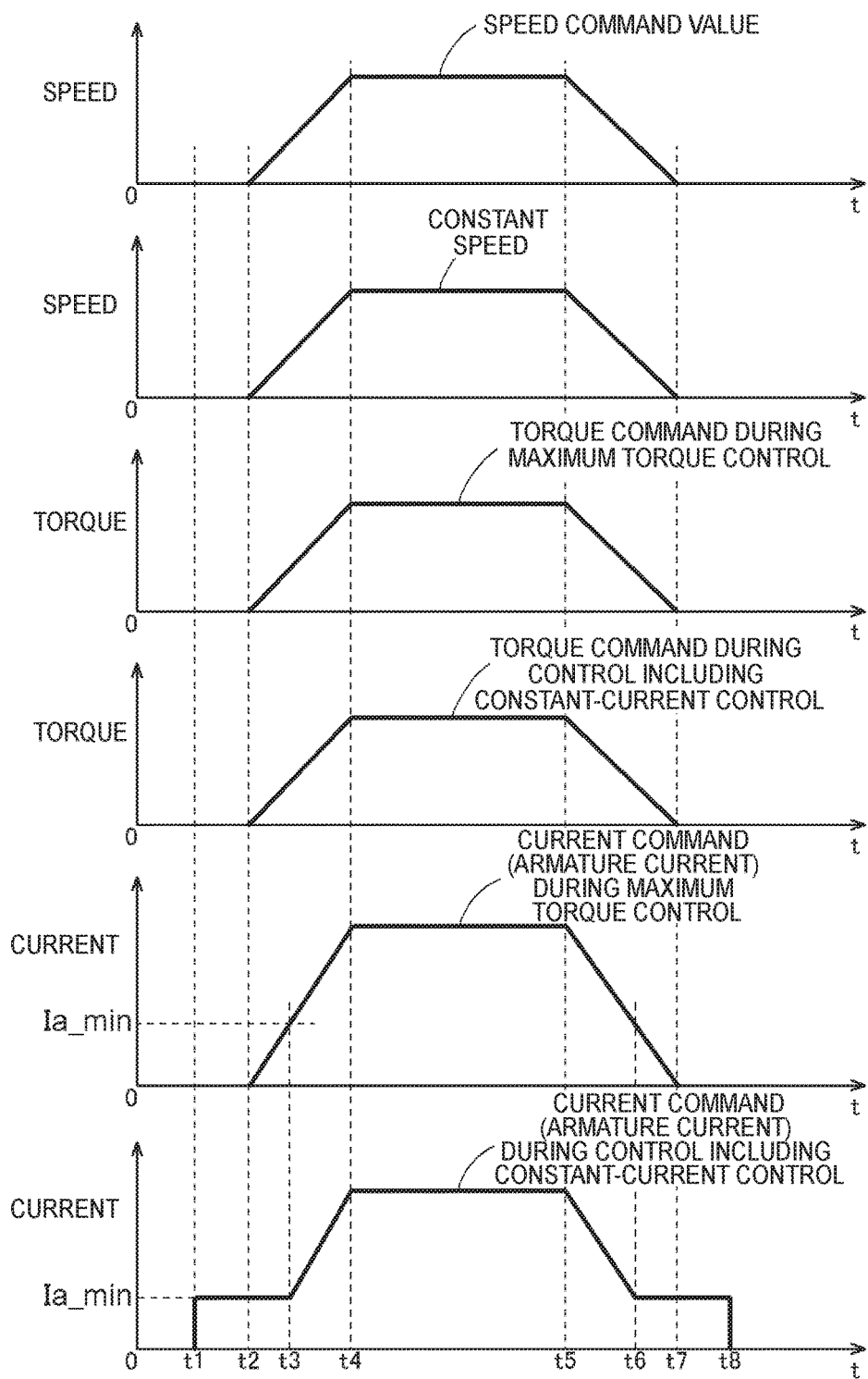
FIG. 9 illustrates waveforms schematically illustrating an example of a current command for a case where control that includes constant-current control is performed.

In the case where control that includes the constant-current control is performed, preferably, the rotary electric machine control device 1 increases the armature current Ia stepwise from zero to at least the lower-limit current Ia_min when the rotary electric machine 80 starts rotating, and decreases the armature current Ia stepwise at least from the lower-limit current Ia_min to zero when the rotary electric machine 80 becomes stationary. FIG. 9 illustrates waveforms schematically illustrating an example of a current command for a case where control that includes the constant-current control is performed. The uppermost part of FIG. 9 indicates a speed command. FIG. 9 schematically illustrates a case where so-called speed sweep, in which the speed is raised from zero to a certain speed, kept at the certain speed, and thereafter dropped to zero in accordance with the lapse of the time, is performed. The second part from the top of FIG. 9 indicates the actual speed of the rotary electric machine 80. Here, it is indicated that the actual speed follows the speed command well. The third and fourth parts from the top of FIG. 9 indicate torque commands. The third part from the top indicates a torque command for normal maximum torque control. The fourth part from the top indicates a torque command for a case where control that includes the constant-current control is performed. As is clear from the waveforms of the two torque commands, the torque command for the maximum torque control (basic control) and the torque command for control that includes the constant-current control are the same as each other.

The second part from the bottom of FIG. 9 indicates a current command (a command for the armature current Ia) for the maximum torque control. The lowermost part of FIG. 9 indicates a current command for a case where control that includes the constant-current control is performed. The current command for the maximum torque control is substantially proportional to the torque command. In the case where control that includes the constant-current control is performed, in contrast, a current command that is equal to or more than the lower-limit current Ia_min is set, irrespective of the torque command, when the value of the torque command is in a low-torque region. That is, when the value of the torque command is in the low-torque region, the current command is set such that the magnitude of the armature current Ia is not less than the lower-limit current Ia_min. In the case where the speed sweep is performed as in FIG. 9, such a low-torque region appears when the rotary electric machine 80 starts rotating and when the rotary electric machine 80 becomes stationary. Thus, as illustrated in the lowermost part of FIG. 9, when the rotary electric machine 80 starts rotating, the rotary electric machine control device 1 increases the armature current Ia stepwise from zero to at least the lower-limit current Ia_min. When the rotary electric machine 80 becomes stationary, meanwhile, the rotary electric machine control device 1 decreases the armature current Ia stepwise from at least the lower-limit current Ia_min to zero.

Specifically, the rotary electric machine control device 1 increases the current command stepwise to the lower-limit current Ia_min at a control start time "t1", and maintains the current value. The current command is kept at the lower-limit current Ia_min until the time "t3" at which the current command, which has been raised in proportion to the torque command from the time "t2", reaches the lower-limit current Ia_min in the maximum torque control. The transition of the current command from the time t1 to the time t3 corresponds to the vector locus along the arrow Y1 in FIG. 8. The transition of the current command after the time "t3" is similar to that for a case of the maximum torque control. That is, the rotary electric machine 80 is controlled in accordance with a current command that is proportional to the torque command. The transition of the current command after the time "t3" corresponds to the vector locus along the arrow Y2 in FIG. 8.

The same control is performed also in the case where the rotary electric machine 80 is decelerated to be stopped. The rotary electric machine control device 1 decreases the current command in proportion to the torque command from the time "t5". When the decreasing current command reaches the lower-limit current Ia_min at the time "t6", the rotary electric machine control device 1 keeps the current command at the lower-limit current Ia_min. At a control end time "t8" which is past the time "t7" at which the current command which is proportional to the torque command becomes zero, the rotary electric machine control device 1 decreases the armature current Ia stepwise to zero. As in the case of the maximum torque control, the transition of the current command from the time "t5" to the time "t6" corresponds to the vector locus along the arrow Y2 in FIG. 8 in the opposite direction. In addition, the transition of the current command after the time "t6" corresponds to the vector locus along the arrow Y1 in FIG. 8 in the opposite direction.

Figure 6:
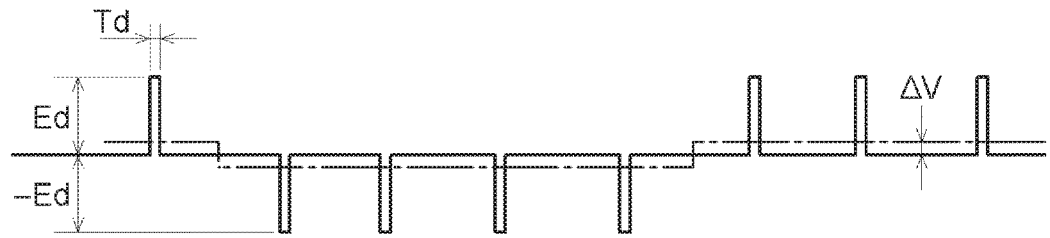
FIG. 6 illustrates a voltage error caused by the dead time.

As discussed above, the error ΔV in the AC voltage is represented by "ΔV≈Ed·Td·fc", where the DC link voltage Vdc is indicated by "Ed" and the carrier frequency during modulation is indicated by "fc" (see FIG. 6). That is, the error ΔV is proportional to the DC link voltage Vdc, and in the case where the DC link voltage Vdc is low, the error ΔV is small, and the influence on the derivation of the magnetic pole position θ is also small. If the armature current Ia which is larger than necessary (larger than the current applied in the basic control) is applied also in the case where the influence on the derivation of the magnetic pole position θ is small, a loss is increased. Thus, the value of the lower-limit current Ia_min is preferably set in accordance with the DC link voltage Vdc. For example, in the case where the DC link voltage Vdc is less than a lower-limit DC link voltage Vdc_min prescribed in advance, it may be determined that the influence of the error ΔV on the computation of the magnetic pole position θ is slight, so that the basic control is performed at all times with the lower-limit current Ia_min set to zero. Alternatively, the lower-limit current Ia_min may be fluctuated in accordance with the DC link voltage Vdc.

Figure 10:
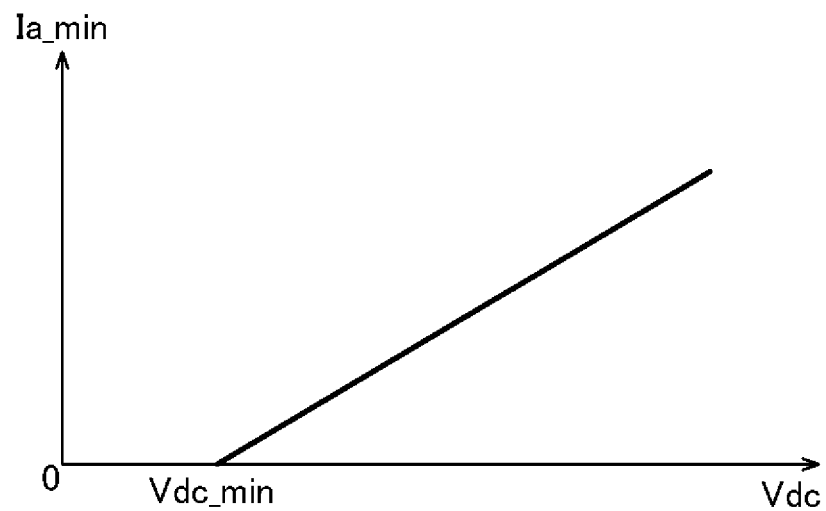
FIG. 10 schematically illustrates the relationship between a lower-limit current and a DC link voltage.

FIG. 10 illustrates an example of the lower-limit current Ia_min which is set in accordance with the DC link voltage Vdc as described above. FIG. 10 illustrates an example in which the lower-limit current Ia_min is set so as to become larger as the DC link voltage Vdc, which is a voltage on the DC side of the inverter 7, becomes higher in the case where the DC link voltage Vdc is equal to or more than the lower-limit DC link voltage Vdc_min which is prescribed in advance. Although FIG. 10 illustrates an example in which the lower-limit current Ia_min is set so as to become continuously larger, the lower-limit current Ia_min may be set so as to become larger stepwise.

In addition, in the case where the magnetic pole position θ is derived by the high speed range-position computation section 21, the extended induced voltage which is indicated by the expression (3) is utilized as discussed above. It is seen from the expression (3) that, as the rotational speed ω becomes higher, "ωId" and "ωK$_E$" also become larger, which also makes the extended induced voltage higher (the expression (3) is given again below).

[Expression 4]

$$\begin{bmatrix} Ed \\ Eq \end{bmatrix} = \{(Ld - Lq)(\omega Id - iq) + \omega K_E\} \begin{bmatrix} 0 \\ 1 \end{bmatrix} \quad (3)$$

If the induced voltage (extended induced voltage) is sufficiently large with respect to the error ΔV in the AC voltage, the error ΔV can be ignored during derivation of the magnetic pole position θ. As is clear from the expression (3), the induced voltage becomes higher as the rotational speed ω of the rotor of the rotary electric machine 80 becomes higher, and thus the value of the lower-limit current Ia_min is preferably set in accordance with the rotational speed ω. For example, in the case where the rotational speed ω is less than a lower-limit rotational speed ω_min which is prescribed in advance, the magnetic pole position θ is computed mainly by the low speed range-position computation section 22, and thus the lower-limit current Ia_min is set to a constant value with respect to the rotational speed ω. In the case where the rotational speed ω is equal to or more than the lower-limit rotational speed ω_min, the value of the lower-limit current Ia_min is preferably fluctuated in accordance with the rotational speed ω.

Figure 11:
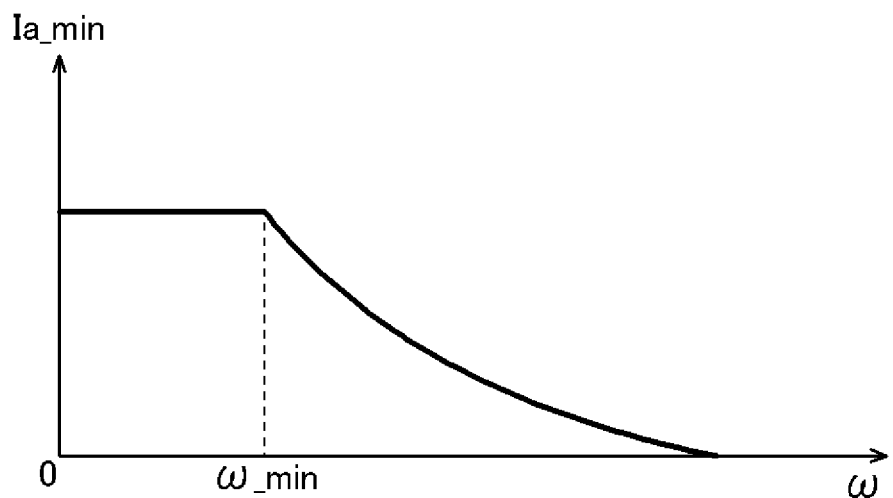
FIG. 11 schematically illustrates the relationship between the lower-limit current and a rotational speed.

FIG. 11 illustrates an example of the lower-limit current Ia_min which is set in accordance with the rotational speed ω as described above. FIG. 11 illustrates an example in which the lower-limit current Ia_min is set so as to become smaller as the rotational speed ω of the rotor of the lower-limit current 80 becomes higher in the case where the rotational speed ω is equal to or more than the lower-limit rotational speed ω min which is prescribed in advance. Although FIG. 11 illustrates an example in which the lower-limit current Ia_min is set so as to become continuously smaller, the lower-limit current Ia_min may be set so as to become smaller stepwise.

As discussed above, the rotary electric machine control device 1 reduces the influence of the dead time Td on the derivation of the magnetic pole position θ by reliably performing the dead-time compensation. Thus, the lower-limit current Ia_min is preferably set to be equal to or more than a minimum current value that enables the dead-time compensation. It is known that the effect of the dead-time compensation differs in accordance with the detection accuracy of the three-phase currents (Iu, Iv, Iw), the stability of the three-phase currents (such as the amount of noise component being small), and the electrical properties of the switching elements such as IGBTs, although not described in detail. Thus, the minimum current value that enables the dead-time compensation is preferably set in view of such elements. For example, the minimum current value is preferably set in accordance with the resolution of the current sensor 30, the amplitude of a ripple component of the three-phase currents detected by the current sensor 30, the element properties (such as the stray capacitance and the on resistance) of the switching elements which constitute the inverter 7, and so forth.

Other Embodiments

Other embodiments will be described below. The configuration of each embodiment described below is not limited to its independent application, and may be applied in combination with the configuration of other embodiments unless any contradiction occurs.

(1) An embodiment in which the rotary electric machine which serves as a drive force source for an automobile is to be controlled has been exemplified above. However, the rotary electric machine to be controlled by the rotary electric machine control device according to the present embodiment is not limited to a rotary electric machine that serves as a drive force source for an automobile. For example, the rotary electric machine to be controlled may be a rotary electric machine that drives an electric oil pump, a compressor for an air conditioner, or the like, even in the case where the rotary electric machine is mounted on an automobile. Alternatively, the rotary electric machine to be controlled may be a rotary electric machine for a railway vehicle or the like that receives power supplied from an overhead wire. Alternatively, the rotary electric machine to be controlled may be a rotary electric machine that drives an air conditioner, a washing machine, or the like in the workplace or in the home.

(2) An aspect in which the extended induced voltage is utilized as the induced voltage has been exemplified above. However, such an aspect does not hinder the use of an induced voltage based on a common voltage equation such as that exemplified in the expression (1) in computing the magnetic pole position. For example, the induced voltage, even if it is a common induced voltage, becomes higher as the rotational speed ω of the rotary electric machine becomes higher, and if the induced voltage is sufficiently large with respect to the error ΔV in the AC voltage due to the dead time Td, the error ΔV can be ignored during derivation of the magnetic pole position θ.

(3) In the above description, the low speed range-position computation section 22 superimposes an observation signal on a voltage command. However, the configuration of the low speed range-position computation section 22 is not limited thereto. It is possible to apply a variety of aspects in which a high-frequency observation signal is applied to the rotary electric machine, and in which the magnetic pole position is estimated in accordance with a response to the observation signal. For example, an observation signal may be superimposed on a current command.

(4) A variety of techniques other than that described above may be applied to detect the magnetic pole position using sensorless control.

Overview of Embodiment

The overview of the rotary electric machine control device (1) according to the embodiment described above will be briefly described below.

In one aspect, the rotary electric machine control device (1):

controls a rotary electric machine (80) that includes a rotor in which a permanent magnet is disposed and that is driven via an inverter (7) that performs power conversion between AC power and DC power;

detects a magnetic pole position (θ) of the rotor through sensorless control;

performs current feedback control, using the magnetic pole position (θ), on the basis of a deviation between a current command (Id*, Iq*) and a feedback current from the rotary electric machine (80) in a d-q-axis vector coordinate system defined by a d-axis which extends in a direction of a magnetic field generated by the permanent magnet and a q-axis which is orthogonal to the d-axis;

performs dead-time compensation in which a start point and an end point of a control pulse for switching elements (3) that compose the inverter (7) are adjusted to reduce an error in AC output due to a dead-time period (Td), in which both an upper switching element (3) and a lower switching element (3), of the switching elements, that compose an arm for one phase of the inverter (7) are controlled into an off state, compared to that for a case where the control pulse is a reference pulse; and performs switching control on the switching elements (3) to drive the rotary electric machine (80), in which in the case where the rotary electric machine (80) is controlled by deciding the current command (Id*, Iq*) in the d-q-axis vector coordinate system such that a magnitude of an armature current (Ia) is minimized in accordance with output torque of the rotary electric machine (80), the rotary electric machine is controlled such that the magnitude of the armature current (Ia) becomes equal to or more than a lower-limit current (Ia_min) prescribed in advance.

In order to accurately detect the magnetic pole position (θ) through sensorless control, it is useful to execute the dead-time compensation. To perform the dead-time compensation, however, it is generally necessary to determine the polarity of the phase current of AC power. Here, in the case where the amplitude of the phase current is small and the wave height of the phase current is close to the center of amplitude of the phase current, such as in the case where the rotary electric machine (80) is driven by low torque, a high accuracy may be required for the determination of the polarity of the phase current, or the reliability of the determination may be lowered depending on the determination accuracy. In the present configuration, the current command (Id*, Iq*) is decided such that the armature current (Ia) becomes equal to or more than the lower-limit current (Ia min) The magnitude of the amplitude of the phase current can be secured by restraining a reduction in armature current (Ia). That is, the amplitude of the phase current can be secured such that the polarity of the phase current can be determined sufficiently. In the case where the magnitude of the armature current (Ia) is equal to or more than the lower-limit current (Ia_min), the armature current (Ia) is not restrained. Thus, the operation efficiency of the rotary electric machine (80) is affected only in the case where the magnitude of the armature current (Ia) is less than the lower-limit current (Ia_min). Thus, with the present configuration, it is possible to provide a sensorless magnetic pole position detection technique that allows the magnetic pole position (θ) of the rotary electric machine (80) to be electrically derived accurately by reducing the voltage error due to the dead time while suppressing the influence on the operation efficiency of the rotary electric machine (80).

To control the rotary electric machine (80), in general, maximum torque control in which maximum torque is output for the armature current (Ia), maximum efficiency control in which the rotary electric machine is driven with a maximum efficiency for the armature current (Ia), or the like is performed as the basic control. In this event, in the d-q-axis vector coordinate system, for example, the operation point is set on a line such as a vector locus (e.g. the maximum torque control line (400)) of the operation point at which maximum torque is output and a vector locus (e.g. a maximum efficiency control line) of the operation point at which the rotary electric machine (80) is driven with a maximum efficiency, and the current value at the operation point is decided as the current command (Id*, Iq*). In order to decide the current command (Id*, Iq*) such that the magnitude of the armature current (Ia) is equal to or more than the lower-limit current (Ia_min) which is prescribed in advance, on the other hand, it is necessary to set the operation point on a line of a vector locus (e.g. the constant-current circle (201 to 203)) of the operation point at which the armature current (Ia) matches the lower-limit current (Ia_min). Thus, the rotary electric machine control device (1) is preferably configured to enable control based on at least such two types of operation points. Although the vector locus and the operation point have been exemplified herein in order to facilitate understanding, it is not meant to be essential to set the operation point in the actual control. In one preferable aspect, the rotary electric machine control device (1) may be capable of executing basic control in which the current command (Id*, Iq*) is decided such that the magnitude of the armature current (Ia) is minimized in accordance with the output torque of the rotary electric machine (80), and constant-current control in which the current command (Id*, Iq*) is decided such that the magnitude of the armature current (Ia) matches the lower-limit current (Ia_min) in the case where the magnitude of the armature current (Ia) in the basic control falls below the lower-limit current (Ia_min); and the rotary electric machine control device (1) may switchably execute the basic control and the constant-current control in accordance with the magnitude of the armature current (Ia).

Here, in the rotary electric machine control device (1), preferably, the armature current (Ia) is increased stepwise from zero to at least the lower-limit current (Ia_min) when the rotary electric machine (80) starts rotating, and the armature current (Ia) is decreased stepwise from at least the lower-limit current (Ia_min) to zero when the rotary electric machine (80) becomes stationary. With the configuration, the current command for the lower-limit current Ia_min or more can be set appropriately even in a low-torque region.

The error in AC voltage due to the dead time (Td) is proportional to the voltage (DC link voltage (Vdc)) on the DC side of the inverter (7), the frequency of the control pulse during switching control on the switching elements (3) (modulation frequency during modulation), and the period of the dead time (Td). Thus, in the case where the DC link voltage (Vdc) is low, the error in AC voltage due to the dead time (Td) is small, and the influence on the derivation and the detection of the magnetic pole position (θ) through sensorless control is also small. If the armature current (ia) which is larger than necessary is applied also in the case where the influence on the derivation of the magnetic pole position (θ) is small, a loss is increased. Thus, the value of the lower-limit current (Ia_min) is preferably set in accordance with the DC link voltage (Vdc). That is, in one aspect, in the rotary electric machine control device (1), the lower-limit current (Ia_min) is preferably set so as to become larger continuously or stepwise as a DC link voltage (Vdc), which is a voltage on a DC side of the inverter (7), becomes higher in the case where the DC link voltage (Vdc) is equal to or more than a lower-limit DC link voltage (Vdc_min) prescribed in advance.

An induced voltage produced by rotation of the rotor of the rotary electric machine (80) is increased in proportion to the rotational speed (ω) of the rotor. In the case where the magnetic pole position (θ) is computed and detected on the basis of the induced voltage which is produced by rotation of the rotor, and if the induced voltage is sufficiently large with respect to the error in the AC voltage, the error can be ignored during derivation of the magnetic pole position (θ). If the armature current (Ia) which is larger than necessary is applied also in the case where the influence on the derivation of the magnetic pole position (θ) is small, a loss is increased. The induced voltage becomes higher as the rotational speed (ω) of the rotor becomes higher, and thus the value of the lower-limit current (Ia_min) is preferably set in accordance with the rotational speed (ω). That is, in one aspect, in the rotary electric machine control device (1), the lower-limit current (Ia_min) is preferably set so as to become smaller continuously or stepwise as a rotational speed (ω) of the rotor becomes higher in the case where the rotational speed (ω) is equal to or more than a lower-limit rotational speed (ω_min) prescribed in advance.

In the rotary electric machine control device (1), in addition, the lower-limit current (Ia_min) is preferably set to be equal to or more than a minimum current value that enables the dead-time compensation. In order to reduce the influence of the dead time (Td) on the derivation of the magnetic pole position (θ), preferably, the dead-time compensation can be performed reliably. With the lower-limit current (Ia_min) set to be equal to or more than the minimum current value that enables the dead-time compensation, the magnetic pole position (θ) of the rotary electric machine (80) can be electrically derived accurately by reliably performing the dead-time compensation and reducing the voltage error due to the dead time (Td). The preceding show, by way of illustration, specific details in which the disclosed embodiments may be practiced. Other embodiments may be utilized and structural and logical changes may be made without departing from the scope of the present disclosure. The various embodiments are not necessarily mutually exclusive, as some aspects of embodiments can be combined with one or more aspects of other embodiments to form additional embodiments.

III. INDUSTRIAL APPLICABILITY

The present invention can be applied to a rotary electric machine control device that controls a rotary electric machine that includes a rotor in which a permanent magnet is disposed and that is driven via an inverter that performs power conversion between AC power and DC power.

DESCRIPTION OF THE REFERENCE NUMERALS

1 ROTARY ELECTRIC MACHINE CONTROL DEVICE
3 IGBT (SWITCHING ELEMENT)
7 INVERTER
80 ROTARY ELECTRIC MACHINE
90 VEHICLE ECU
Ia ARMATURE CURRENT
Ia_min LOWER-LIMIT CURRENT
Id* d-AXIS CURRENT COMMAND (CURRENT COMMAND)
Iq* q-AXIS CURRENT COMMAND (CURRENT COMMAND)
Td DEAD TIME (DEAD-TIME PERIOD)
Vd d-AXIS VOLTAGE COMMAND
Vdc DC LINK VOLTAGE
Vdc_min LOWER-LIMIT DC LINK VOLTAGE
ΔV ERROR
θ MAGNETIC POLE POSITION
θ^ ESTIMATED MAGNETIC POLE POSITION (MAGNETIC POLE POSITION)
ω ROTATIONAL SPEED
ω^ ESTIMATED ROTATIONAL SPEED (ROTATIONAL SPEED)
ω_min LOWER-LIMIT ROTATIONAL SPEED

The invention claimed is:
1. A rotary electric machine control device that is configured to:
control a rotary electric machine that includes a rotor in which a permanent magnet is disposed and that is driven via an inverter that performs power conversion between AC power and DC power;

detect a magnetic pole position of the rotor through sensorless control;

perform current feedback control, using the magnetic pole position, on the basis of a deviation between a current command and a feedback current from the rotary electric machine in a d-q-axis vector coordinate system defined by a d-axis which extends in a direction of a magnetic field generated by the permanent magnet and a q-axis which is orthogonal to the d-axis;

perform dead-time compensation in which a start point and an end point of a control pulse for switching elements that compose the inverter are adjusted to reduce an error in AC output due to a dead-time period, in which both an upper switching element and a lower switching element, of the switching elements, that compose an arm for one phase of the inverter are controlled into an off state, compared to that for a case where the control pulse is a reference pulse; and perform switching control on the switching elements to drive the rotary electric machine, wherein in a case where the rotary electric machine is controlled by deciding the current command in the d-q-axis vector coordinate system such that a magnitude of an armature current is minimized in accordance with output torque of the rotary electric machine, the rotary electric machine is controlled such that the magnitude of the armature current becomes equal to or more than a lower-limit current prescribed in advance, and wherein the lower-limit current is set to be equal to or more than a minimum current value that enables the dead-time compensation.

2. The rotary electric machine control device according to claim 1, wherein:

the rotary electric machine control device is configured to execute:

basic control in which the current command is decided such that the magnitude of the armature current is minimized in accordance with the output torque of the rotary electric machine, and constant-current control in which the current command is decided such that the magnitude of the armature current matches the lower-limit current in the case where the magnitude of the armature current in the basic control falls below the lower-limit current; and the rotary electric machine control device switchably executes the basic control and the constant-current control in accordance with the magnitude of the armature current.

3. The rotary electric machine control device according to claim 1, wherein the armature current is increased stepwise from zero to at least the lower-limit current when the rotary electric machine starts rotating, and the armature current is decreased stepwise from at least the lower-limit current to zero when the rotary electric machine becomes stationary.

4. The rotary electric machine control device according to claim 1, wherein the lower-limit current is set so as to become larger continuously or stepwise as a DC link voltage, which is a voltage on a DC side of the inverter, becomes higher in the case where the DC link voltage is equal to or more than a lower-limit DC link voltage prescribed in advance.

5. The rotary electric machine control device according to claim 1, wherein the lower-limit current is set so as to become smaller continuously or stepwise as a rotational speed of the rotor becomes higher in the case where the rotational speed is equal to or more than a lower-limit rotational speed prescribed in advance.

6. The rotary electric machine control device according to claim 2, wherein the armature current is increased stepwise from zero to at least the lower-limit current when the rotary electric machine starts rotating, and the armature current is decreased stepwise from at least the lower-limit current to zero when the rotary electric machine becomes stationary.

7. The rotary electric machine control device according to claim 2, wherein the lower-limit current is set so as to become larger continuously or stepwise as a DC link voltage, which is a voltage on a DC side of the inverter, becomes higher in the case where the DC link voltage is equal to or more than a lower-limit DC link voltage prescribed in advance.

8. The rotary electric machine control device according to claim 2, wherein the lower-limit current is set so as to become smaller continuously or stepwise as a rotational speed of the rotor becomes higher in the case where the rotational speed is equal to or more than a lower-limit rotational speed prescribed in advance.

9. The rotary electric machine control device according to claim 7, wherein the lower-limit current is set so as to become smaller continuously or stepwise as a rotational speed of the rotor becomes higher in the case where the rotational speed is equal to or more than a lower-limit rotational speed prescribed in advance.

10. The rotary electric machine control device according to claim 6, wherein the lower-limit current is set so as to become larger continuously or stepwise as a DC link voltage, which is a voltage on a DC side of the inverter, becomes higher in the case where the DC link voltage is equal to or more than a lower-limit DC link voltage prescribed in advance.

11. The rotary electric machine control device according to claim 6, wherein the lower-limit current is set so as to become smaller continuously or stepwise as a rotational speed of the rotor becomes higher in the case where the rotational speed is equal to or more than a lower-limit rotational speed prescribed in advance.

12. The rotary electric machine control device according to claim 10, wherein the lower-limit current is set so as to become smaller continuously or stepwise as a rotational speed of the rotor becomes higher in the case where the rotational speed is equal to or more than a lower-limit rotational speed prescribed in advance.

* * * * *